March 5, 1963 V. L. PEICKII 3,079,632
HIGH SPEED MOLDING MACHINE
Filed May 16, 1960 9 Sheets-Sheet 1

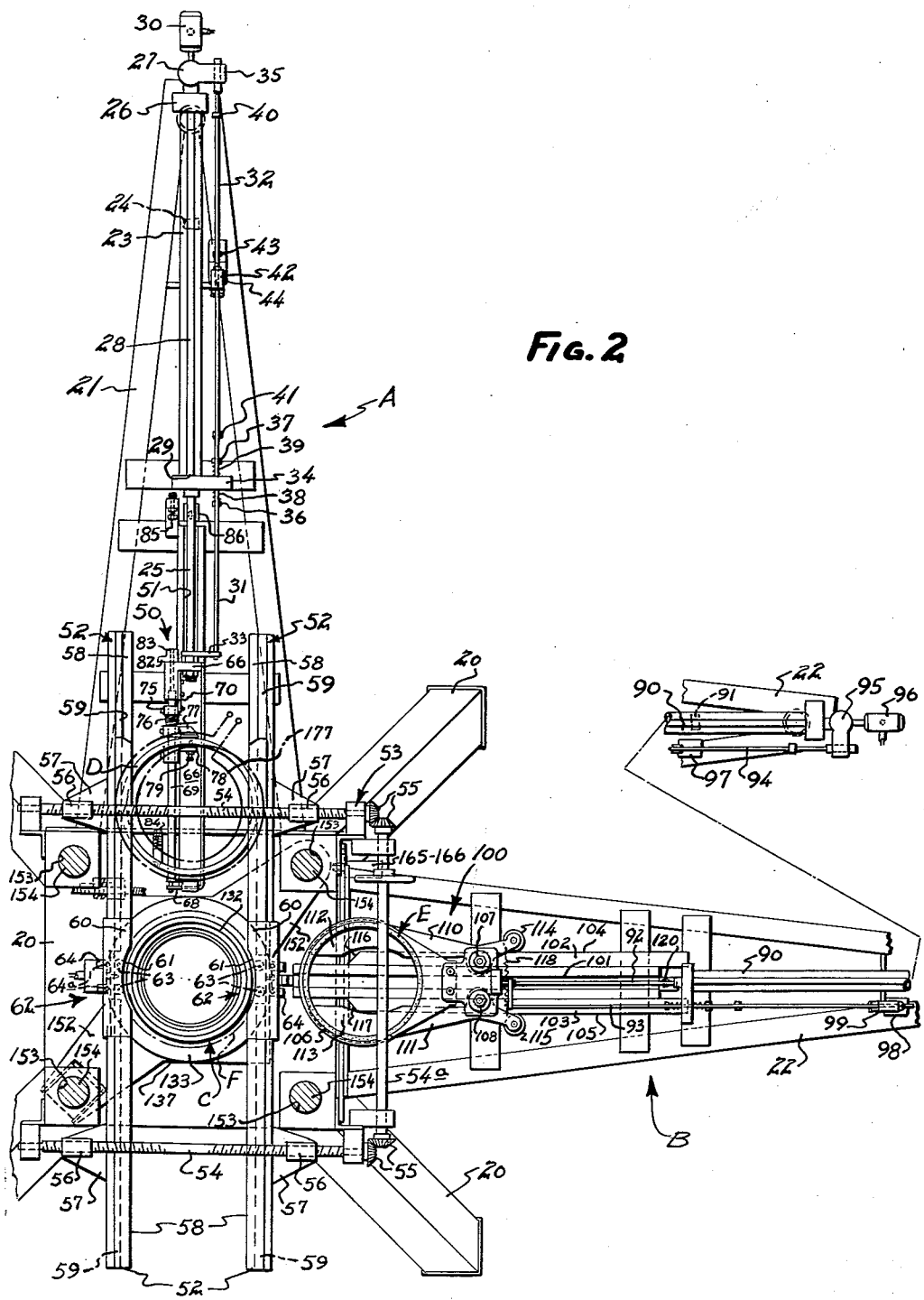

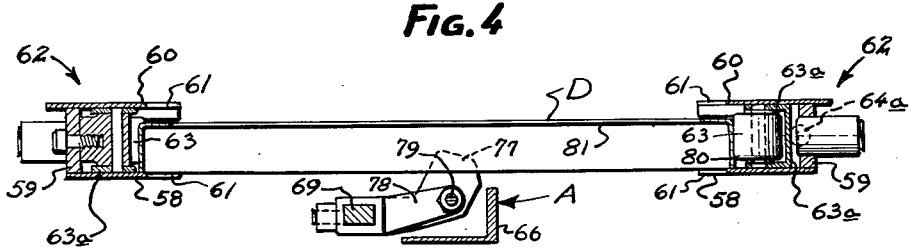
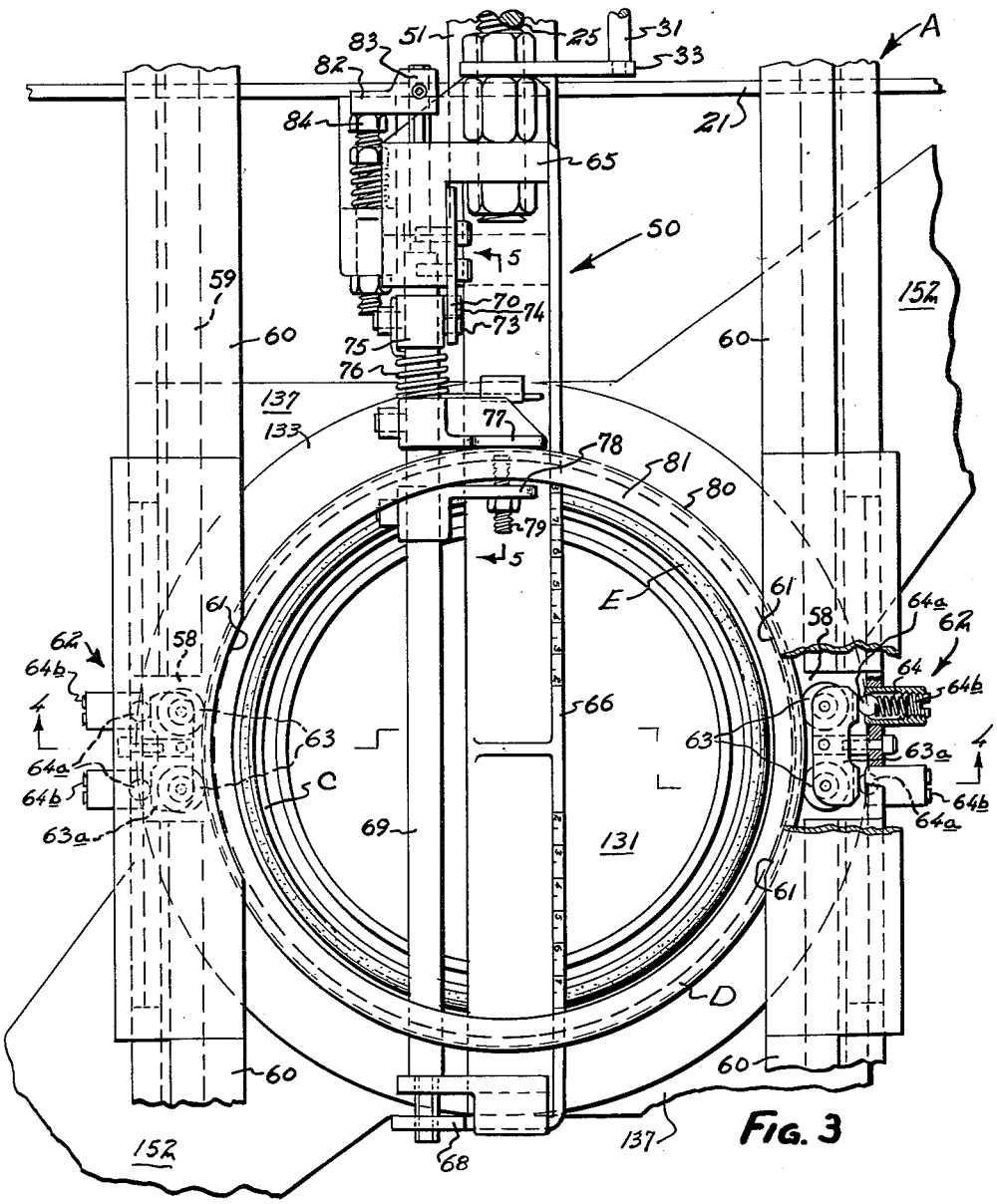

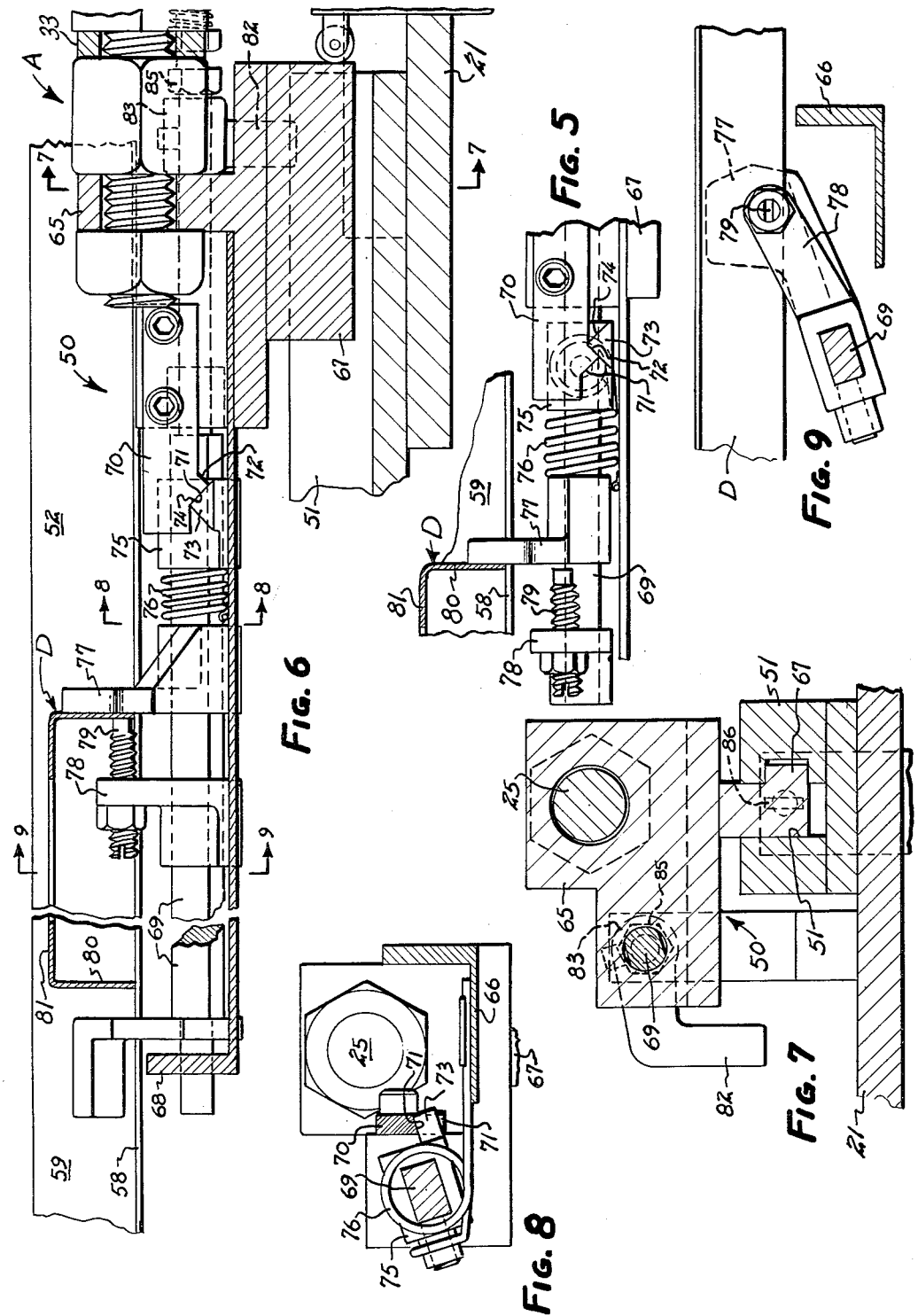

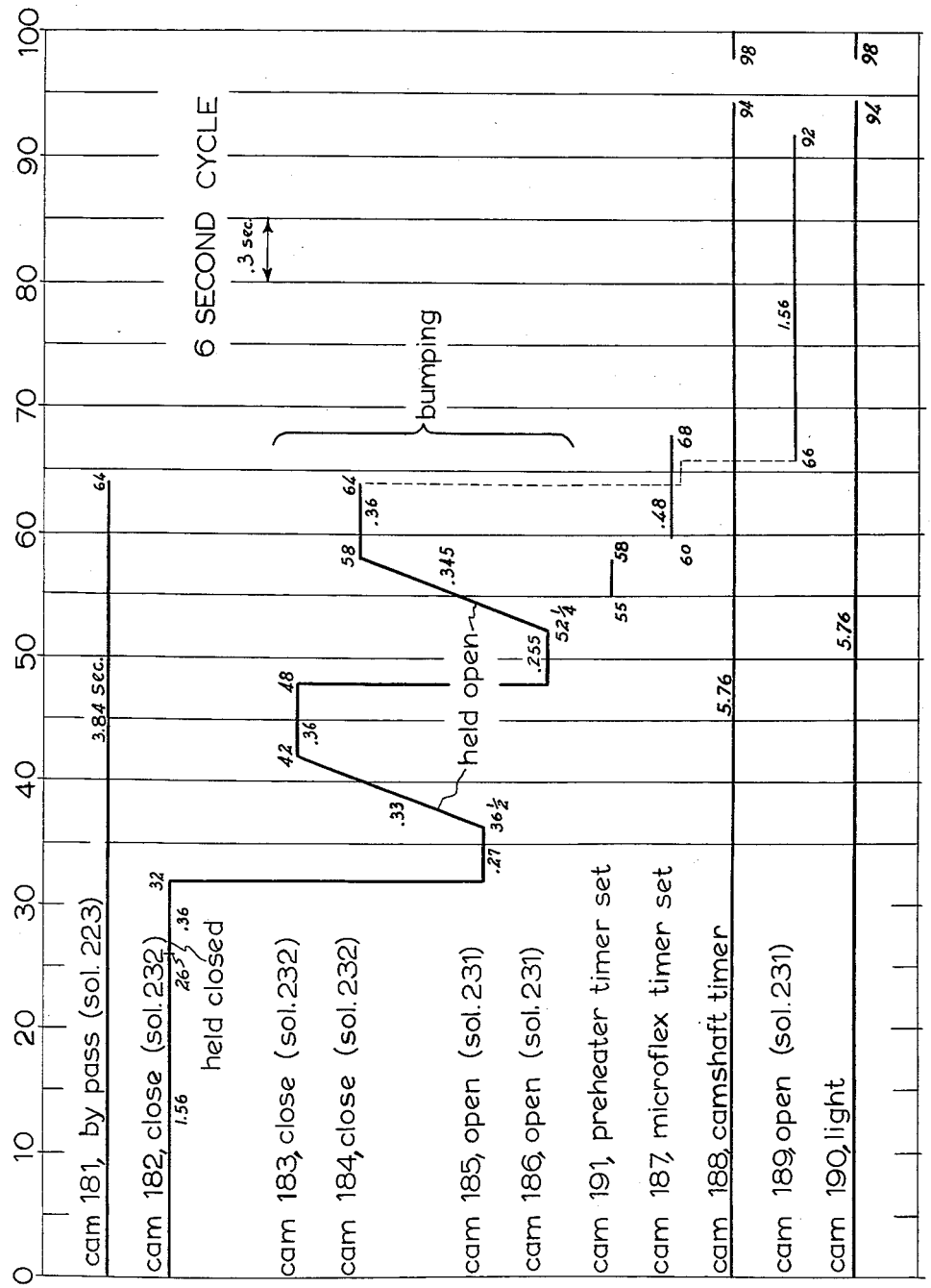

United States Patent Office 3,079,632
Patented Mar. 5, 1963

3,079,632
HIGH SPEED MOLDING MACHINE
Vasalie L. Peickii, Hillsborough, Calif., assignor to Federal-Mogul-Bower Bearings, Inc., Detroit, Mich., a corporation of Michigan
Filed May 16, 1960, Ser. No. 29,239
14 Claims. (Cl. 18—5)

This invention relates to a quick-acting, single-cavity molding machine, particularly applicable for high-speed, high-temperature molding of synthetic rubber.

While it is well-known that the time for curing or vulcanizing synthetic elastomers decreases with an increase in temperature, it is also well-known that when the cure time becomes very short, it becomes very difficult to mold satisfactorily. In very rapid molding where the cure process occupies only a few seconds, temperature control is more critical than at lower temperatures and longer cure times. In rapid-cure processes, the time it takes to heat the mold to the cure temperature cannot be disregarded, and the amount of time that the elastomer is in contact with a hot mold before and after the mold is closed also affects the cure. To count the cure time as only that time when the mold is closed, is inaccurate if the mold is hot before it is closed and if it takes a finite time to close and open. Since the time and heat involved in these usually disregarded phases may be appreciable, the problem of employing rapid cure processes has been difficult.

The present invention provides a mold assembly which is particularly applicable to high-speed molding. It is characterized by its ability to load and unload the mold rapidly, by its control of temperature, and by its foolproof automatic operation. To illustrate the principles involved, the molding of an annular radial shaft seal to a supporting metal case is shown and described in detail, since that is a very important use to which this machine is especially well adapted, but the invention is applicable to other types of shaft seals and also to other products made in high-speed molding.

A single-cavity mold, if used with high enough temperatures and if capable of very high-speed operation during loading and unloading of the mold, as it is when made according to the present invention, can be as productive as a plural-cavity mold. That is, it may produce as many cured articles in a given time as a plural-cavity mold can produce in the same time. This enables a net reduction in tooling expenses, for while such a single-cavity mold is preferably machined more carefully and made from better materials than are typical plural-cavity molds, and is therefore likely to be somewhat more expensive than an individual single cavity of a plural-cavity mold; nevertheless, it is still much less expensive to make a very high quality single-cavity mold than to make the several satisfactory cavities required by a plural-cavity mold.

The invention also solves the problem of getting enough heat into a single-cavity mold to enable this rapid production rate, approximately the same amount of heat being consumed in curing twenty-five seals successively in this mold as in curing twenty-five seals simultaneously in a 25-cavity mold. Here, the heat has to be concentrated into a relatively small area, and the mold has to be opened and closed in such a manner that the heat dissipated or wasted does not become critical.

Also, the invention enables a use of higher pressures per cavity while still enabling the use of lighter pieces of equipment, since the total pressure exerted is necessarily much less than the total pressure exerted in a plural-cavity mold.

Another very important feature of the invention is the rapidity with which the mold is loaded with uncured elastomer and a metal case and with which the finished device is ejected after it has been cured.

Other objects and advantages will appear in the following description of a preferred embodiment.

In the drawings:

FIG. 2 is a view in horizontal section taken along the line 2—2 in FIG. 1, the right-hand end again being broken off, and, in this instance, shown above the parts that connect directly with it.

FIG. 3 is an enlarged fragmentary top plan veiw of the case-advancing mechanism, shown in its fully advanced position, with a case placed in the molding position. A portion of the machine has been broken away and shown in section.

FIG. 4 is a view in vertical section taken along the line 4—4 in FIG. 3.

FIG. 5 is a fragmentary view in vertical section on a further enlarged scale, taken along the line 5—5 in FIG. 3.

FIG. 6 is a fragmentary view in elevation and in section, on the scale of FIG. 5, of the case-advancing mechanism, which is here shown in its fully retracted position. The view has been broken between its ends to conserve space.

FIG. 7 is a view in vertical section taken along the line 7—7 in FIG. 6.

FIG. 8 is a view in vertical section taken along the line 8—8 in FIG. 6.

FIG. 9 is a view in vertical section taken along the line 9—9 in FIG. 6.

FIG. 17 is a graphical illustration of a cycle operation of the camshaft and the switches it operates for controlling the mold operation.

Figure 1:
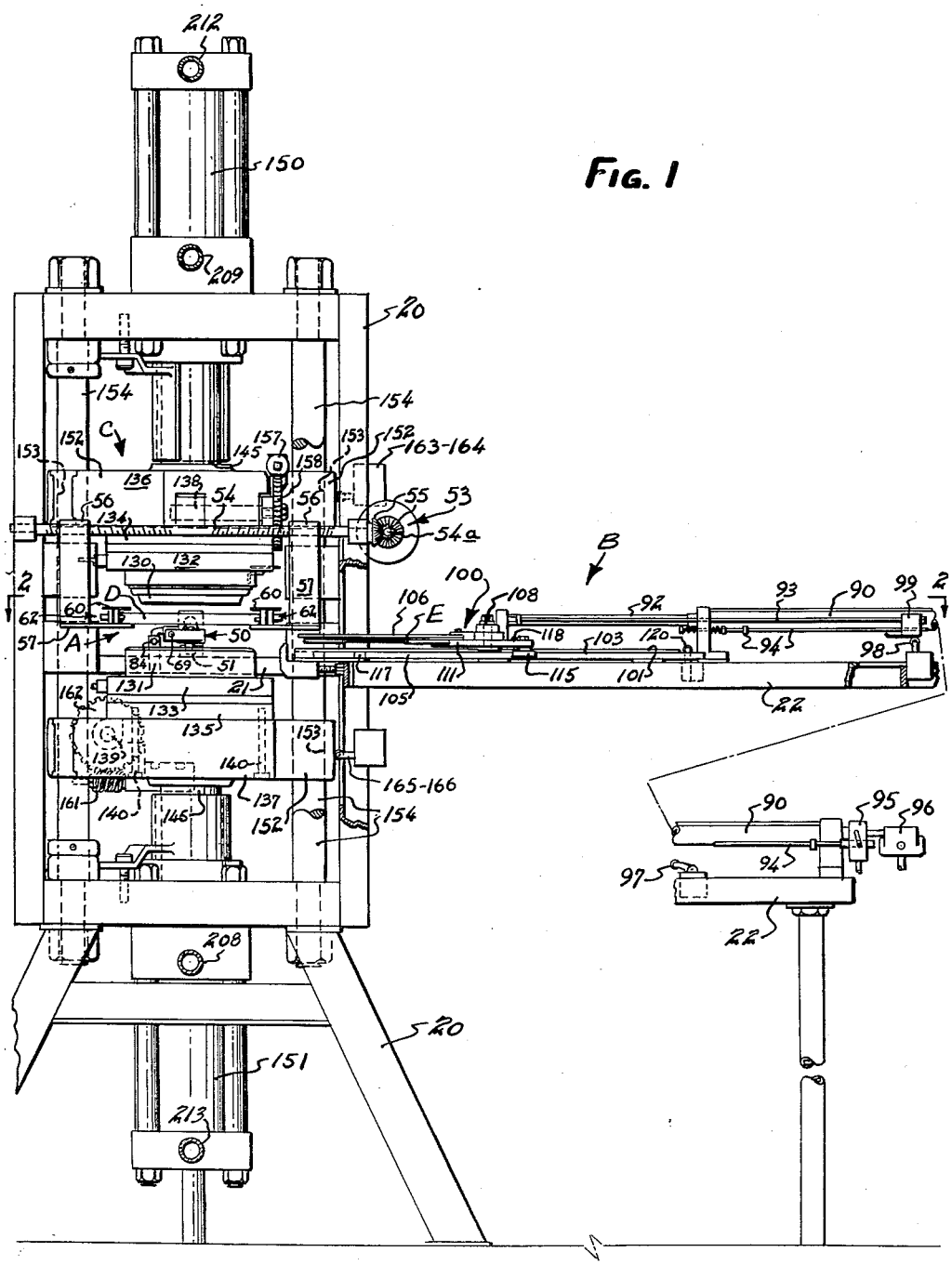
FIG. 1 is a view in elevation and partly in section of a high-speed molding machine embodying the principles of the invention, shown with the mold open and the elastomer-advancing mechanism in its ready position. Some parts are broken off, and the right-hand end is shown below the parts that connect directly with it, in order to save space.
Figure 11:
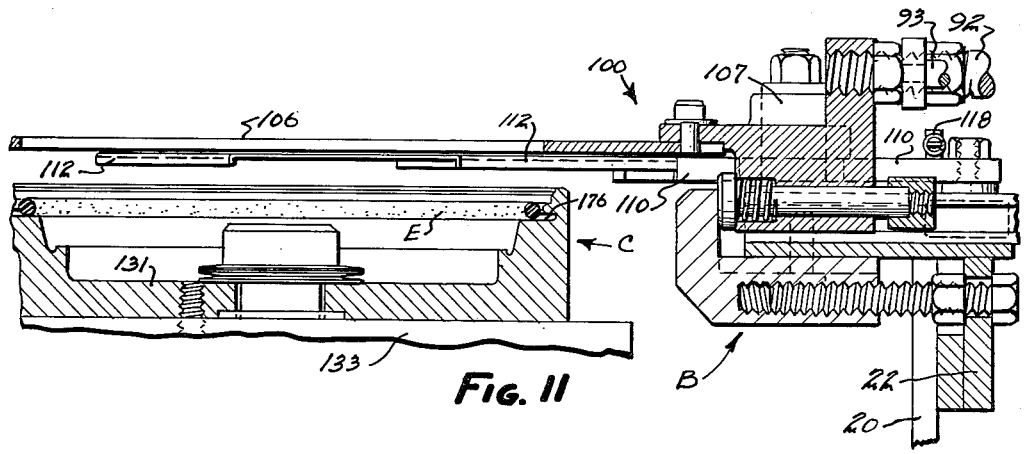
FIG. 11 is a view in vertical section taken along the line 11—11 in FIG. 10.

General Explanation (FIGS. 1 and 2)

The device of this invention molds one seal at a time in rapid succession. In the embodiment of FIGS. 1 and 2, a case-advancing mechanism A is mounted at right angles to an elastomer-advancing mechanism B, the two mechanisms meeting at a mold C. When the case-advancing mechanism A is in its fully retracted position, an annular metal case D is placed therein; then the mechanism A is advanced to a ready position where the case D is preheated. Similarly, when the elastomer-advancing mechanism B is in a fully retracted position, an elastomeric ring E is placed in it, and the mechanism B is then advanced to its ready position, there is no preheating of the ring E. Subsequently, the mechanism A advances the preheated case D into the mold C, and the mechanism B advances the ring E into the mold C and deposits it there, the mechanisms A and B then being immediately brought back to their fully retracted loading positions. Then a seal F is molded while the mechanisms A and B are reloaded, moved to their ready positions, and a case D preheated. The introduction of the next case D into the mold C causes ejection of the completed seal F.

The device has both mechanical and electrical aspects, and an important feature is the control mechanism that inter-relates the various portions of the device. The mechanical aspects of each portion will be described first, then the electrical and hydraulic elements, and finally the control and the sequence of operations.

*The Case-Advancing Mechanism A*
*(FIGS. 1–9 and 16)*

The basic framework may all be secured together, there being shown a main or mold-supporting frame 20 from which extends a frame 21 for the mechanism A and a frame 22 for the mechanism B, but parts of the mechanisms A and B are shown supported directly by the mold frame 20.

A pneumatic cylinder 23 is mounted on the outer portion of the frame 21 and has a reciprocating piston 24 with a rod 25 that extends toward the mold C. At the outer end 26 of the cylinder 23 is a directional valve 27 having a first position sending air into the cylinder's outer end 26 and to move the piston 24 and rod 25 toward the mold C, and a second position sending air through a tube 28 to the inner end 29 of the cylinder 23, for retracting the piston 24 and rod 25. The valve 27 is preferably of the type providing single-cycle operation, being solenoid-opened by a momentary pulse and pneumatically maintained until it reaches the retracted position and then automatically closed. The Bellows Co. "BCAEM" valve may be used for this purpose. There is also a double-solenoid on-off valve 30 for admitting air to or cutting it off from the valve 27, depending on which solenoid is actuated by the electrical circuit, as explained later. For example, the valve described in U.S. Patent No. 2,641,229 may be used.

The valve 27 is mechanically actuated at each end of the stroke of the piston 24 to reverse the direction in which the piston 24 and the rod 25 will next move. Actuation of the valve 27 is accomplished by movement of two rods 31 and 32, both mounted parallel to the rod 25. The rod 31 is mounted for reciprocating movement along with the rod 25, being connected rigidly to it by a link 33 at the forward end of the rod 25 and sliding freely through a support bearing 34. The rod 32 may be supported directly below (or above, if desired) the rod 31 for limited sliding movement through the bearings 34 and 35. A pair of collars 36 and 37 are adjustably secured to the rod 32, one on either side of the bearing member 34, and retain respective bumper springs 38 and 39 that cushion shock and limit the movement of the rod 32. Near the outer end of the rod 32 is secured a collar 40, and another collar 41 is secured near the collar 37. A block 42 affixed on the rod 31 and freely slidable on the rod 32 engages the collars 40 and 41 when the rod 31 is in its extreme positions to move the rod 32 a short distance. The rod 32 is mechanically connected to the valve 27, and movement of the rod 32 acts to reverse the valve 27, which is kept open for its full cycle from the retracted position of the piston 24 back to the same position and is then closed.

The block 42 also engages and momentarily closes an electrical switch 43 as the rod 25 moves from the retracted position to the "ready" position, where the block 42 engages and holds closed a switch 44. The effect of this actuation will be explained later. The switches 43 and 44 are so mounted, according to well-known practice, that they are not actuated by movement of the block 42 in the reverse direction.

The forward end of the piston rod 25 is secured to a carriage assembly 50 (FIG. 3), whose weight is fully supported by a stationary carriage-guide track 51 (FIGS. 6 and 7) on which it slides back and fourth and by which the proper lateral alignment is maintained. The track 51 is located between a pair of case guide rails 52 that are supported indirectly by the frame 20 through a width-adjustment mechanism 53 (FIG. 2). The mechanism 53 includes two threaded shafts 54, an unthreaded shaft 54a, two sets of shaft-mounted bevel gears 55, and interiorly threaded collars 56 mounted on the threaded shafts 54. The collars 56 are attached to brackets 57 that support the rails 52, so that by turning either one of the shafts 54, the spacing between the rails 52 can be changed while keeping the rails 52 parallel to each other.

The rails 52 have a bottom horizontal flange 58 and side flanges 59, and adjacent the mold C they have a top horizontal flange 60, which has an arcuate reinforced cutway portion 61. The mechanism 53 is used to adjust the width between the rails 52 so that the diameter between the cut-away portions 61 is the same as the inner periphery of the case D, and thereby these portions 61 strip the seal F from the mold C when the mold C is opened. At the center of the cutaway portions 61 (FIGS. 3 and 4) the side flanges 59 support a case-gripping device 62 that engages the case D and holds it during the molding operation. As shown in FIGS. 3 and 4, each device 62 includes a pair of anti-friction rollers 63 supported by a plate 63a. The plate 63a is urged away from the flange 59 by a pair of balls 64a, each yieldably held by a spring 64 whose tension is adjusted by threaded members 64b. When case D is pushed past a roller 63, the ball 64a yields inwardly on its yieldable mounting 64. Then the pressure is out of balance until the case D is centered, so there is a self-centering action. This action accurately centers the case D in the mold C and in the stripping area 61.

The carriage 50 includes a bracket 65 that is bolted to the rod 25 and to which a carriage frame 66 is secured. This bracket 65 has a depending portion 67 that rides on the guide track 51. At the other end of the carriage frame 66 is a bracket 68. The brackets 65 and 68 support a rod 69 for limited free sliding and rotary movement adjacent the bracket 65. The carriage also supports a rod-rotating member 70 (see FIGS. 5 and 6) having a forward, inclined, cam surface 71 with a short latch-keeper 72 at its lower end. The rod 69 is keyed to a cammed triangular latch 73 having a forward surface 74 inclined at the same angle as the cam surface 71. A collar 75 keyed to the rod 69 retains one end of a spring 76, which is wound several coils around the rod 69 and then secured to the carriage frame 66. The spring 76 urges the rod 69 to a rotational position corresponding to that shown in FIG. 6, while lengthwise movement of the rod 69 toward the rod 25 relative to the member 70 causes the cam surface 74 to slide down the cam surface 71 until the latch 73 is latched in the keeper 72, as in FIG. 5, thereby rotating the rod 69 a few degrees.

Rigidly secured to the rod 69 and rotatable with it are a case pusher 77 and a case lock member 78. The member 78 has a set screw 79 that is adjustable to the thickness of the case D. A typical case D has a cylindrical flange 80 and a radial flange 81. The set screw 79 engages one side of the flange 80, and the pusher 77 engages the other side, holding it snugly between them when the rod 69 is in the rotational position shown in FIG. 6. In this position they carry the case D forward into the mold C and locate it positively at a definite position. Then the rod 69 is moved rearwardly by engagement of a bracket 82, secured to the rod 69 by a sleeve 83, with a frame supported spring-cushioned stop 84. This moves the latch 73 relative to the member 70 and rotates the rod 69 until the set screw 79 and cam lock member 78 are below the case D, the latch 73 being locked in its FIG. 5 position. Then, rearward movement of the carriage 50 will leave the case D in its molding position, held by the case-grippers 62. When the carriage 50 reaches its retracted position, the sleeve 83 engages a spring-cushioned stop 85 on the frame 21, and the latch 73 is freed from the keeper 72. The spring 76 then restores the rod 69 to its normal position with the pusher 77 and lock member 78 elevated for reception of the next case D between them. When the carriage 50 returns to its fully retracted position, it also trips an electric switch 86 whose purpose will be explained later.

Each time that a case D is carried into the mold C by the carriage 50, a completed seal F is ejected along the rails 52 and slides beyond the mold area, driven by the momentum imparted by the case D.

*The Elastomer-Advancing Mechanism B (FIGS. 1, 2, 10, 11 and 16)*

The frame 22 supports a second pneumatic cylinder 90 with a piston 91 and rod 92, exactly like the cylinder 23. Parallel rods 93 and 94 correspond to the rods 31 and 32, and control a reversal valve 95 of the same single-cycle type as the valve 27. There is also a double-solenoid-operated control valve 96 and electric switches 97 and 98 controlled by a block 99 on the rod 93. Operation of these elements is the same as that of the corresponding ones on the mechanism A.

A carriage 100 is secured to the piston rod 92 and slides over a supporting track 101, which is provided with a pair of outside rails 102 and 103 whose vertical edges provide cam tracks 104 and 105. The carriage 100 includes a ring 106 in which the elastomeric ring E fits. A pair of pins 107 and 108 pivotally secure a pair of levers 110 and 111 to the carriage 100. To the forward parts of the levers 110 and 111 are secured supporting arms 112 and 113 that extend beneath the ring 106 and support the ring E during its forward travel.

Figure 10:
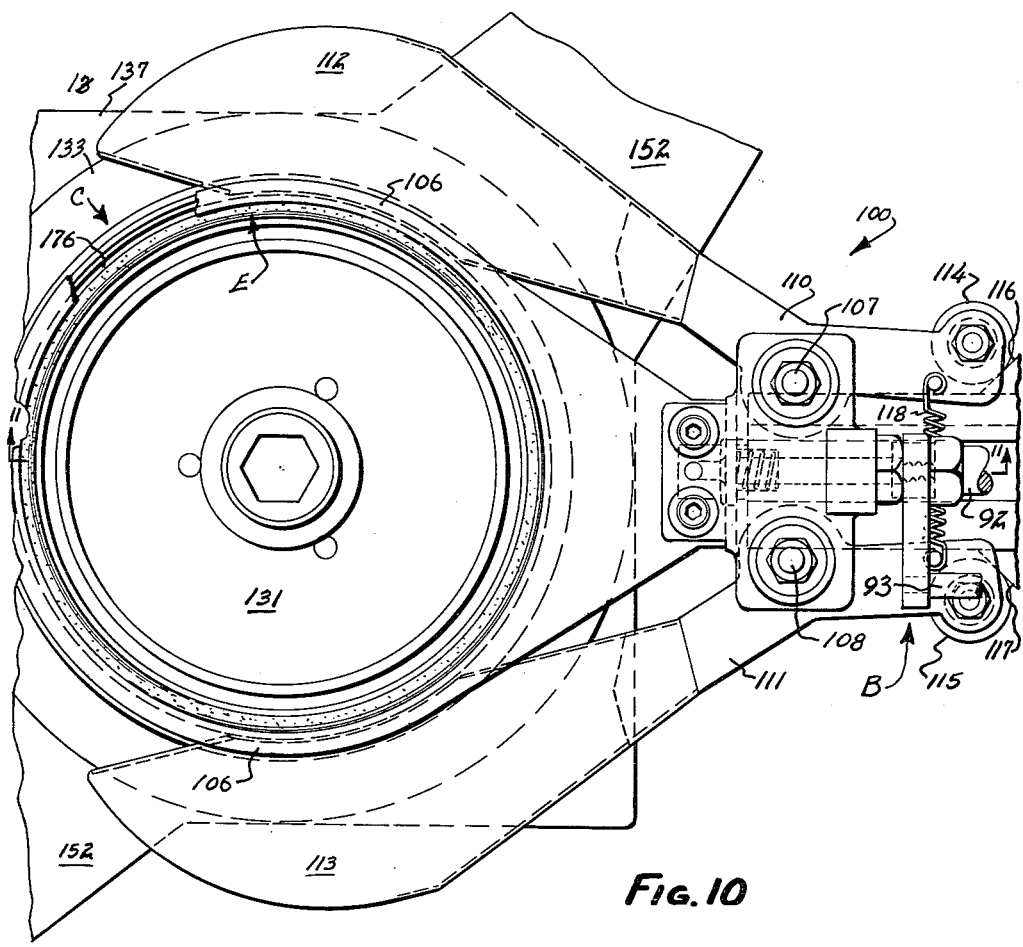
FIG. 10 is an enlarged fragmentary top plan view of the elastomer-advancing mechanism in its fully advanced position where it drops its elastomeric ring into the mold cavity. A portion of the device has been broken away to show the mold below.

Cam rollers 114 and 115 are rotatably supported on the rear ends of the levers 110 and 111. The rollers 114 and 115 respectively ride on the cam tracks 104 and 105, and as long as they ride on the tracks 104 and 105, the arms 112 and 113 remain largely inside and beneath the ring 106. However, at the end of each track 104, 105 is an inwardly inclined cam track 116, 117, and when the rollers 114 and 115 reach those portions 116 and 117, a spring 118 connected across the rollers 114 and 115 causes them to follow the tracks 116 and 117 inwardly. This action spreads the arms 112 and 113 apart beyond the ring 106, as shown in FIG. 10, so that the ring E then drops out of the ring 106 into the mold S. (See FIG. 11.) Retraction of the carriage 100 results in the arms 112 and 113 moving into their support position again, and when the carriage 100 returns to its fully retracted position, an electrical switch 120 is tripped by the rear end of the carriage 100, for a purpose that will be explained later.

*The Mechanism of the Mold C (FIGS. 1, 2, 10–14 and 16)*

Figure 12:
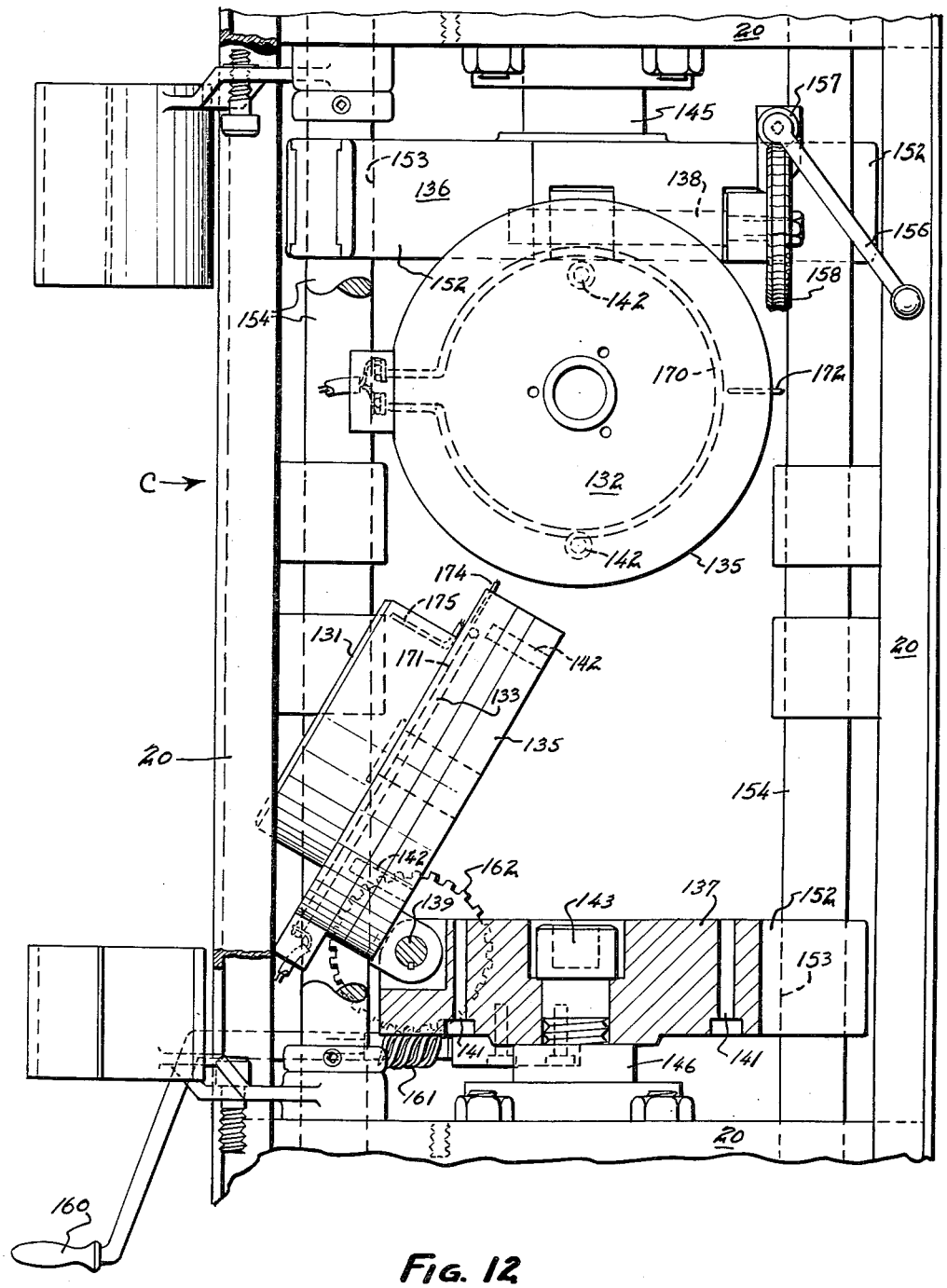
FIG. 12 is an enlarged view in elevation of the mold portion of the device, showing the upper mold swung down 90° to its cleaning position and the lower mold partly swung up to its cleaning position.

The mold C proper comprises an upper half 130 and a lower half 131. Each mold half is secured to and engages a respective heat platen 132, 133 which, in turn, rests on a support platen 134, 135. As best shown in FIGS. 1 and 12, each support platen 134, 135 is pivotally secured to a base plate 136, 137 by a short shaft 138, 139 to which the platen 134, 135 is keyed. Normally, each platen 134, 135 is secured to its respective base plate 136, 137 by anchor bolts 140 (FIG. 1) that extend through openings 141 in the base plate 136, 137 and thread into openings 142 in the platen 134, 135.

The base plates 136, 137 are secured as by the bolts 143 to respective piston rods 145, 146 (FIG. 12) of pistons 147, 148 (FIG. 16) that reciprocate in hydraulic cylinders 150, 151. Each base plate 136, 137 is provided with a pair of lugs 152 having openings 153 that serve to guide the mold elements in their vertical travel along two guide rods 154.

When it is desired to clean the molds 130 and 131, the bolts 140 are removed. Then a handle 156 may be turned to revolve a worm 157 that rotates a gear 158, to which the shaft 138 is keyed, thereby turning the upper mold 130 down 90°. Similarly, a handle 160, worm 161, and gear 162 turn the mold 131 up 90°. Preferably, as shown in FIG. 12, the shafts 138 and 139 are at right angles to each other, so that the lower mold 131 is swung out to face a different side from that faced by the mold 130 when it is swung out.

During operation of the device, vertical movement of the upper mold half 130 past a certain position actuates electrical switches 163 and 164, both actuated by a single lever. Vertical movement of the lower mold half 131 past a corresponding position similarly actuates electrical switches 165 and 166. The effects of such actuation will be discussed later.

Figure 14:
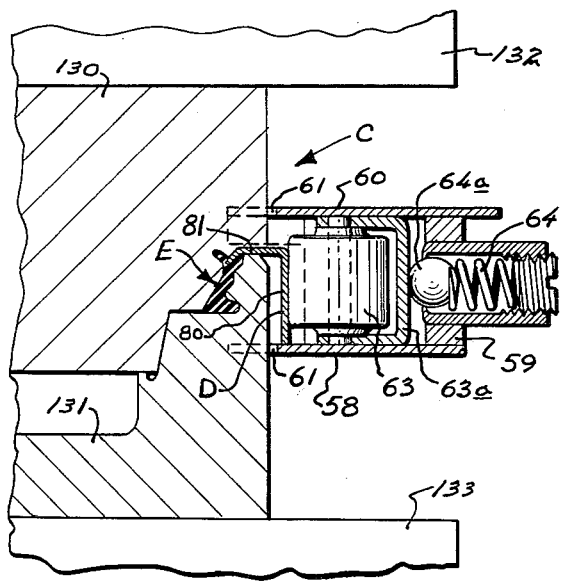
FIG. 14 is a similar view of the mold in its fully closed position.
Figure 15:
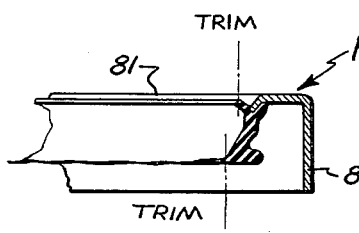
FIG. 15 is a fragmentary sectional view of a portion of a molded shaft seal, before trimming, as made by the mold of FIGS. 13 and 14.
Figure 13:
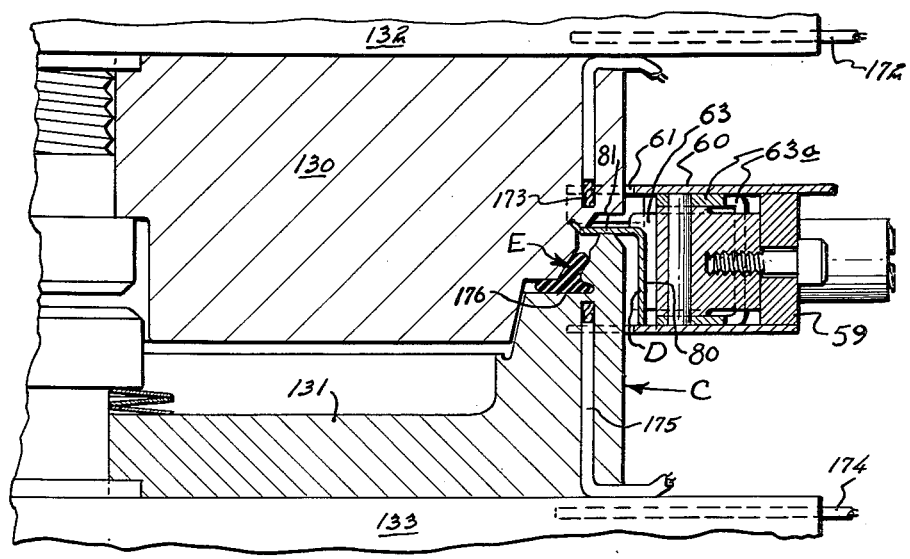
FIG. 13 is a further enlarged fragmentary view in elevation and partly in section of a portion of the mold just before the mold is fully closed.

As shown best in FIGS. 13 and 14, the invention preferably employs the technique disclosed in the Robert N. Haynie patent application Serial Number 799,834, filed March 6, 1950, the mold cavities being made accordingly. However, other shapes, techniques, and products may be accommodated by this invention. It will be noted that the ring E is engaged originally outside the cavity and is forced by heat and pressure to flow into the cavity and become bonded to the metal case D.

*Heating the Mold and Preheaters (FIGS. 2, 12 and 16)*

Cast into the heating platens 132 and 133 are resistance heat coils 170 and 171, which thereby are located very close to the mold elements 130 and 131. The power supplied to these coils 170 and 171 is controlled by a thermostatic arrangement that preferably includes two thermocouples for each coil. One thermocouple 172 is in the upper heating platen 132 near its outer periphery, the point most likely to be cool, while another thermocouple 173 is in the upper mold 130 very close (e.g., $\%_{64}''$) to the surface where the metal case D is engaged; i.e., the point where the heat is used. The lower heating platen 133 also has a thermocouple 174 near its outer periphery, and the lower mold element 131 has a thermocouple 175 as close as possible to the mold cavity 176, normally about $\%_{64}''$.

In addition to the mold heating system, a preheating ring 177 may be used as an induction-type heater for preheating the metal case D up to about the molding temperature. The ring 177 is located over the ready station of the case D. As soon will be seen, the heating ring 177 may be actuated when a vase D is at or due at the ready station, to heat it even though it is exposed, induction heat being efficient and effective for this purpose.

*The Camshaft Control System (FIGS. 16 and 17)*

Figure 16:
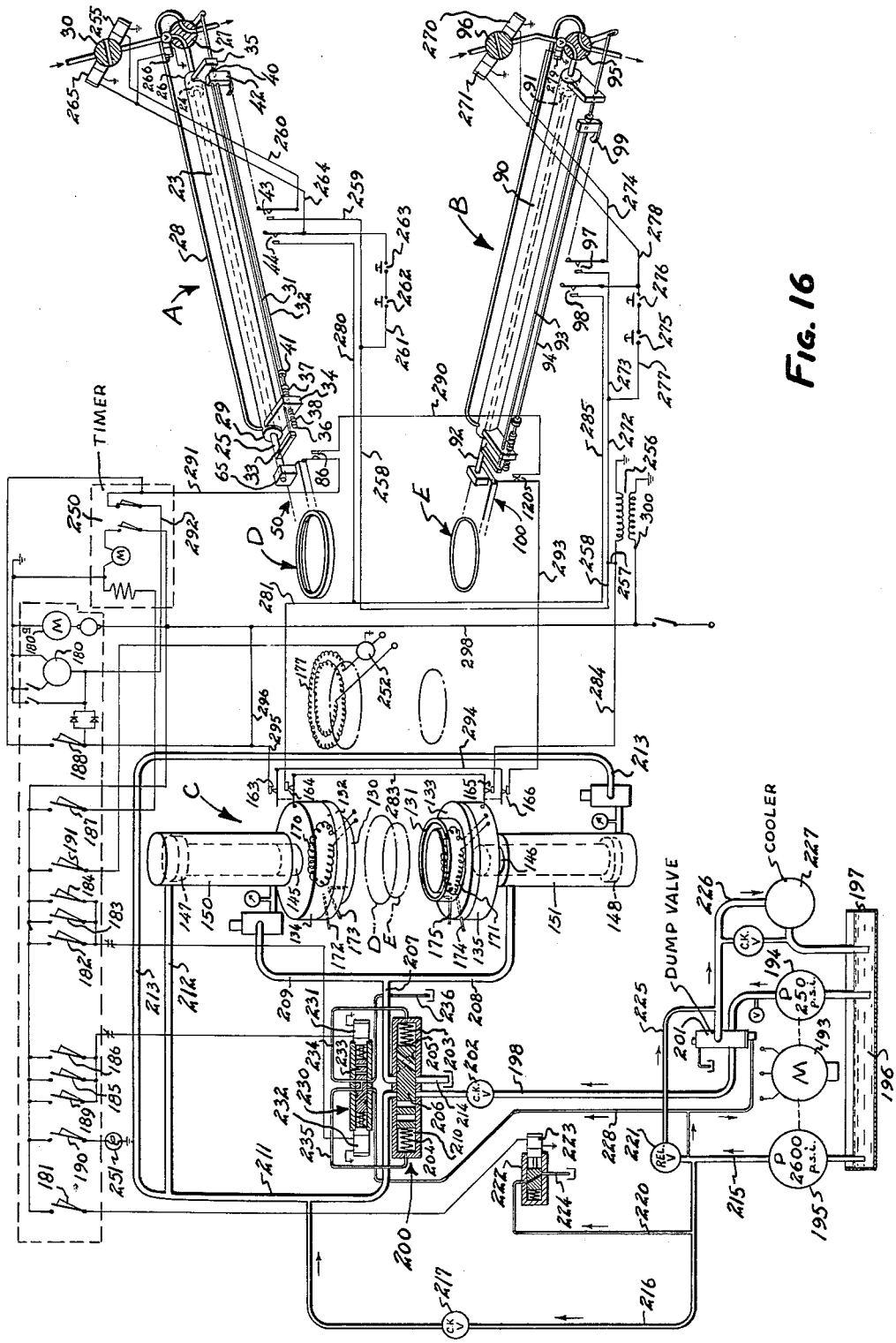
FIG. 16 is a partly diagrammatic, partly representational view showing the electric and hydraulic circuits and portions of the pneumatic circuits and mechanical devices actuated by and actuating the circuit elements.

The opening and closing of the mold C by the hydraulic cylinders 150 and 151, and the sequence of certain operations are controlled by a rotating shaft 180 (shown diagrammatically only in FIG. 16) having a plurality of cams 181 through 191 mounted thereon to close and open a series of electrical switches at predetermined rotative positions of the shaft 180 and to hold them closed or open for predetermined portions of the rotating cycle of the shaft 180. For convenience, each switch will be designated by the same number as its cam. To illustrate the principles of the invention, FIG. 17 is given as an example. Here the camshaft 180 takes six seconds to rotate, not counting pauses in its rotation, for there are pauses during the time the elastomer is curing in the mold and for other purposes. In FIG. 17, the 6-second cycle is broken down into 100 percentage divisions, and lines are used to show the pattern of actuation of the cam-switches and the inter-relationship between certain of them. In FIG. 16 the electrical circuit is given, along with the hydraulic and pneumatic circuits these cams and switches control.

*The Hydraulic System for Opening and Closing the Mold (FIG. 16)*

Two hydraulic circuits are used, one for a small volume of liquid under high pressure (e.g., 2600 p.s.i.) and another for a larger volume of liquid under lower pressure (e.g., 250 p.s.i.). The low-pressure liquid is used for rapidly filling the system during the opening and early phases of closing the mold C, while the high-pressure liquid is used when the system is full to exert high final closing pressure on the mold and is also used to operate control valves. A single motor 193 may operate both a high-velocity vane pump 194 and a high-pressure multi-piston pump 195 to pump fluid 196 from a common reservoir 197 into the respective systems.

The vane pump 194 sends the fluid 196 from the common reservoir 197 through a conduit 198 to a main valve 200 via a dump (i.e., return) valve 201 and a check valve 202. The main valve 200 is normally urged closed by springs 203 and 204, and when it is closed the fluid is returned to the reservoir 197 by the dump valve 201. Admission of high pressure fluid to a chamber 205 moves a valve member 206 to the left and sends fluid from the conduit 198 into a conduit 207 that leads to both hydraulic cylinders 150 and 151 by branch conduits 208 and 209, to force the mold halves 130 and 131 apart. Similarly, admission of high pressure fluid into a chamber 210 moves the valve member 206 to the right and sends fluid from the conduit 198 into a conduit 211, whence it can pass via branch conduits 212 and 213 to the top of the upper cylinder 150 and the bottom of the lower cylinder 151, resulting in closure of the mold C. When one conduit 207 or 211 is being filled, the other conduit 211 or 207 is being drained by the valve 200 into a conduit 214, which returns that fluid to the reservoir 197.

The high pressure pump 195 pumps a smaller quantity of the fluid 196 from the reservoir 197 into a conduit 215 that leads to several branches. One branch 216 leads through a check valve 217, which opens only when a certain pressure is applied from the line 216 and will not open at all in the other direction. Thence, the line 216 leads via line 211 to lines 212 and 213 to apply a very high pressure to the mold C during the final stages of closing, without having to apply any significant volume of liquid.

Another branch 220 leads to a normally open valve 222 which is closed by energization of a solenoid 223. The valve 222, when open, returns the liquid to the reservoir 197 by conduit 224. When closed, the valve 222 enables pressure to build up for use in the line 216. A relief valve 221 is provided as a safety device that returns liquid to the reservoir 197 when excessive pressure builds up, through conduits 225 and 226 and oil cooler 227.

A small conduit 228 leads from the conduit 215 to a main high-pressure control valve 230 that has two solenoids 231 and 232. When the solenoid 231 is energized, a valve element 233 moves to the right and sends high-pressure fluid through a conduit 234 to the chamber 205 to actuate the valve 200 to thereby send the low-pressure fluid into the conduit 207 and open the mold C. Actuation of the solenoid 232 moves the valve element 233 to the left and sends high-pressure fluid through a conduit 235 into the chamber 210 so that the low-pressure fluid flows into the conduit 211 and closes the mold C. A return conduit 236 carries high-pressure fluid back to the reservoir 197 from the unactuated valve chamber 205 or 210, just as the conduit 214 returns the low-pressure fluid.

Further features of the operation of the hydraulic circuit and its relationship to other parts of the machine will be explained further after describing the electrical circuit that controls it.

*Camshaft Control of the Hydraulic Circuit (FIGS. 16 and 17)*

The cam-switch 181 energizes the solenoid 223 to close the by-pass valve 222. The cam-switch 181 is energized from the beginning of the cycle up through the curing of the elastomer; then it is de-energized, the valve 222 opens, and the high pressure fluid is by-passed back to the reservoir 197.

Each of the three cam switches 182, 183 and 184 operates when actuated at seperate times in the cycle to energize the solenoid 232 that effectuates closure of the mold C, while each of the three cam-switches 185, 186 and 189 operates, when actuated (also at separate times in the cycle) to energize the solenoid 231 that effectuates opening of the mold C. As seen in FIG. 17, at the beginning of the cycle, the cam-switch 182 causes the mold halves 130 and 131 to move toward each other, but as soon as they come together, the cam-switch 182 is de-actuated and the cam-switch 185 is actuated to cause the mold halves 130 and 131 to move apart. They move apart only a short distance, e.g., about ⅛" when the cam-switch 185 is opened. They are held open about 0.33 second and then the cam-switch 183 is actuated to cause the mold halves 130 and 131 to move together again. Again, they kiss and are again moved apart, this time a shorter distance, e.g., about 1/16", by the actuation of the cam-switch 186, are held open about 0.345 second and then they are closed by the actuation of the cam-switch 184. This time they stay closed while the elastomer is cured. Then, when the cure cycle (a separate cycle) is complete, the cam-switch 189 opens the mold to end the camshaft cycle. The alternating opening and closing (or "bumping") of the mold drives all the air out of the mold and fills the cavity 176 with rubber. This bumping is accomplished very rapidly in this invention.

As soon as the cam-switch 184 closes the mold for the actual molding, the cam-switch 187 actuates a timer 250 that then takes over, the rotation of the camshaft 180 being stopped at about 62% through its cycle and held there for however long the elastomer is to be cured, which may be only a few seconds. At the end of the timed curing period, the camshaft 180 is again rotated, beginning at point 62% and continuing through the cycle. Then the cam switch 189 energizes the solenoid 232 to open the mold.

The cam switch 188 acts to time the camshaft 180 itself, to assure that it will run through its cycle only once and then stop at the gap between 94% and 98%. However, if the switches 43, 97, 163, and 165 are all closed, the cycle will continue. This effect will be elaborated upon later. The cam switch 190 parallels the cam switch 188 and indicates whether the cam shaft is turning by lighting a lamp 251. It may, if desired, be combined into the cam switch 188.

The cam switch 191 turns on a timer 252 for the preheater 177, which then runs for any desired time interval, as required by the preheater 177. Alternatively, if desired, the preheater 177 may be manually operated.

*Circuit for the Case Loader A and Elastomer Loader B (FIG. 16)*

The switch 43 is in series with a solenoid 255 for the valve 30. When the switch 43 is momentarily closed, it energizes the solenoid 255 to turn off the supply of air to the valve 27 without affecting the opening or closing of the valve 27 itself. To trace this circuit, power from a transformer 256 goes via leads 257, 258 and 259 to the switch 43 and thence, when the switch 43 is closed, via lead 260 to the solenoid 255 and thence to ground.

From the lead 258, a lead 261 goes via push-button (manual) switches 262 and 263 (two switches in series for safety reasons, requiring both hands to operate them) and via a lead 264 to a second solenoid 265 on the valve 30 and to a solenoid 266 on the valve 27. The solenoid 265, when momentarily energized, opens the valve 30 and sends air to the valve 27. The valve 30 stays in the position to which it is moved by either solenoid 255 or 265 until it is moved from that position by momentary energization by the other solenoid 265 or 255. The solenoid 266 opens the valve 27, which is then held open as by a pneumatic device like that shown in U.S. Patent No. 2,641,229, until the full cycle of movement of the piston 24 has been completed and is then automatically (mechanically) shut off and closed.

Similarly the valve 96 has solenoids 270 and 271. The momentary energization of the solenoid 270 turns off the valve 96, the solenoid 270 being energized by closure of the switch 97, current then passing via leads 257, 272, 273, the switch 97, and a lead 274. The solenoid 271 is momentarily energized and turns on the valve 96 when push buttons 275 and 276 are simultaneously depressed, current flowing via the leads 257, 272, 277, switches 275 and 276, and lead 278. At the same time the valve 95 is opened by energization of its solenoid 279, the valve 95 being like the valve 27.

The solenoid 265 that actuates the valve 30 to its open position is also in series with the switch 44, which is connected by leads 280 and 281 to the switch 164, which is closed when the mold half 150 is raised to its upper position and is otherwise open. The switch 164 is series-connected by a lead 283 to the switch 165, which is closed when the mold half 151 is lowered to its lower position and is otherwise open. A lead 284 connects the switch 165 to the lead 257. Similarly, the solenoid 271 that opens the valve 96 is connected to the switch 98, which is connected to the lead 281 by a lead 285. Thus the solenoids 265 and 271 are also energized whenever the switches 44, 98, 164 and 165 are all closed, automatically sending air through the valves 30 and 27 and through the valves 96 and 95 to operate the pistons 24 and 91.

The switch 86, which is closed upon return of the carriage 50 and is otherwise open, is series-connected by a lead 290 to the switch 120, which is closed by return of the carriage 100 and is otherwise open. The switch 86 is connected by leads 291 and 292 to the motor 180. The switch 120 is connected by a lead 293 to the switch 166, which is connected to the switch 163 by a lead 294. The switch 163 is connected by leads 295, 296, and 298 to a power line 300 for operating the motor 180a for the shaft 180 just long enough to bridge the gap provided by the cam 188 to start a new cycle going. In other words, when both the carriages 50 and 100 are retracted, they close the switches 86 and 120 and, the mold halves 130 and 131 then being open, the switches 163 and 166 are closed and a new cycle thereupon begins. Once past the gap, the cam 188 assures eventual completion of the cycle.

*Operation*

Starting with the mold C open and the loaders A and B fully retracted, the operator may place a case D in the loader A and momentarily press the buttons 262 and 263. This action energizes the solenoids 265 and 266 and so opens the valves 30 and 27 and sends air into the cylinder 23 and moves the piston 24 and rod 25 toward the mold C. Movement of the rod 25 carries along the rod 31, which carries its block 42. When the block 42 passes over the switch 43, it momentarily closes the switch 43, energizing the solenoid 255 and thereby closing the valve 30 and shutting off the supply of air to the cylinder 23. Momentum carries the block 42 past the switch 43 onto the switch 44, closing it and opening the switch 43. This action places the case D in its ready position, where it is preheated, in a manner soon to be explained, by the preheater 177. The switches 163, 164, 165, and 166 are now open, as will soon be seen.

The operator also loads an elastomeric ring E into the loader B and presses the buttons 275 and 276 momentarily, to open the valves 96 and 95. This moves the piston 91, and the rods 92 and 93 forward, until the block 99 closes the switch 97 that closes the valve 96. Then momentum carries the block 99 past the switch 97 and opens it, while closing the switch 98. The elastomeric ring E is now in its ready position.

When the mold halves 150 and 151 are opened, their switches 163, 164, 165, and 166 are closed. When all of the switches 44, 98, 164, and 165 are closed, the solenoids 265 and 271 are again energized to send the carriages 50 and 100 forward. At their forwardmost position, the mechanical linkage of the rods 32 and 94 reverses the valves 27 and 95 so that air passes to the ends of the cylinders 23 and 90 that are nearer the mold C. This action reverses the direction of movement of the carriages 50 and 100, and since air is still being supplied, they move away from the mold C. Meanwhile, the case D is seized by the device 62, and engagement of the stop 84 by the member 82 rotates the rod 69 to release the case D from the carriage 50, leaving the case D in its molding position. At the same time, the ring E is dropped by the carriage 100 into the mold cavity of the lower mold 130, due to the action of the cam rollers 114 and 115 on the cams 116 and 117, opening the arms 112 and 113. So the carriages 50 and 100 drop their load and immediately return. When they return, they both shut off the valves 27 and 95 and mechanically reverse the direction of the valves 27 and 95 so that they will be ready for the next cycle. Also, they close the switches 86 and 120.

With the switches 86, 120, 163, and 166 all closed, the camshaft 180 is moved enough to energize the camshaft timer 188, to cause the camshaft 180 to begin its cycle, this action bridging the 94–98% gap in FIG. 17. The camshaft 180 begins its cycle by closing the cams 181, 182, 188, and 190. The cam-switches 188 and 190 merely run the camshaft 180 and show that it is on. The cam 181 energizes the bypass solenoid 223 to close the bypass valve 222 and send the high-pressure fluid to the hydraulic circuits. The cam 182 energizes the solenoid 232 which moves the valve element 233 to send high pressure fluid into the chamber 210 of the valve 100. As a result, the high-velocity fluid is routed to begin closure of the mold C rapidly. During the closure process, the cam-switches 185, 183, 186, and 184 bump the air out of the mold cavity by reversing the directions of movement of the mold halves. The high-pressure fluid through the conduit 216 into the conduit 211 assures that at closure the mold pressure will reach the desired valve.

During this operation, the operator is reloading the loaders A and B with a new case D and ring E and sending them into the ready position. They move no further at this time, for the switches 163, 164, 165, and 166 are all open. However, the preheater 177 is energized at about 55% of the cycle, a little over 3 seconds, and the case D is preheated from then on until the desired heat is attained or until the case D is to be moved to the mold. (The first cycle may be a dry run, without case or elastomer, the preheat usually beginning on the second cycle and continuing thereafter.)

At about 60% of the cycle, the curing timer 250 is actuated to start the curing cycle. This actuator soon stops the camshaft 180 as closure of the mold C is completed. The timer 250 takes over, suspending the camshaft cycle at this point until the curing cycle is completed and then automatically returning operation to the camshaft. Meanwhile, the next case is being preheated to molding temperature—a very important step in this rapid molding operation.

When curing is completed, the timer 250 causes the camshaft 180 to start again, and it soon energizes the cam-switch 189 to open the mold C. When the mold C is open, the switches 163, 164, 165, and 166 are closed, and the carriages 50 and 100 move in. The new case D pushes the completed seal F out of the way and is deposited in the centering device 62, and the new ring E is dropped into the mold C. The carriages 50 and 100 are retracted and go back as before, again closing the switches 86 and 120 to bridge the camshaft timer gap and start the next cycle.

Some Advantages of the Invention

From the foregoing, it will be seen that the invention is characterized by many important and unusual results. For example, it will be seen that both the case D and ring E are rapidly and accurately fed into the mold C. It is a very short stroke from the ready position into the position where the members D and E are deposited in the mold C. The present invention makes this very short stroke possible and can be contrasted with devices where the full stroke would be used for feeding or where attempts would be made to put the case D or ring E into the feeding mechanism A and B at points closer to the mold C. Neither one of these alternatives are practical, whereas the two-step feeding of this invention is practical and the very short final stroke it provides means that hardly any time is actually taken in the feeding. Moreover, during the ready stage the case D is being preheated so that it is already at the mold temperature when inserted in the mold C and therefore no heat of the mold itself is wasted. Still further, the use of induction heat means that very little energy is wasted in heating elements other than the case D, and that this heating can be done in the open rather than in an enclosure like the mold C.

The device is foolproof. The feeding devices A and B cannot move past their ready positions unless the mold C is open, since the switches 163, 164, 165, and 166 must be closed before the feeding mechanisms A and B can advance beyond their ready position. Neither of mechanisms A or B will advance unless the other one is ready, since the switches 44 and 98 are in series. Moreover, the case D is accurately and automatically centered in the mold C and the rubber ring E, which is less important to center, is also dropped in correct position. Furthermore, the feeding mechanisms A and B are fully withdrawn from the mold C before the mold can close, since the switches 86 and 120 must be closed before the mold C will close.

The mold itself opens and closes quite rapidly. It begins closing as soon as the switches 86 and 120 are actuated, and the high-volume low-pressure fluid causes very rapid closing. The high pressure fluid is applied only when the mold is closed and the system is full and is then applied instantaneously. The mold reaches its bumping stage in little more than one-and-a-half seconds after the switches 86 and 120 are closed, and the opening is likewise rapid. The six-second cycle given as an example may, of course, be shortened or, if desired, it may be lengthened, but it is quite a practical length to use. When used, there are only six seconds out of every cycle in which actual molding is not going on. The time of molding can also be made very short by the use of high temperatures. The operation of the mold itself, as well as the operation of the feeding mechanisms, insures that the mold is open only a minimum amount of time, and so little heat is lost to the atmosphere in comparison with conventional molds; the overall time is so short that the operation is quite comparable with the speed obtained by plural cavity molds even when these use high temperatures.

Moreover, the use of a single-cavity mold at high temperatures is more practical than the high-temperature use of plural-cavity molds because there is no problem of individual variations between mold cavities as are present in plural-cavity molds. Therefore, the mold of this invention is more consistent in its operation and there will be fewer rejects. All that need be done is to obtain the necessary relation between time and temperature, and then the operation is repetitive until the compound itself is in some way changed. Consequently, it will be seen that the present invention enables economical, rapid molding of elastomeric members in quantities quite suitable to mass-production, even though only a single cavity is used. The device, of course, could be made to have plural connections with the same controls but these are rarely advisable.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A molding machine for molding and simultaneously bonding elastomeric material to a metal member, comprising: a vertically mounted mold having upper and lower movable mold members; first feeding means movable back and forth in a straight line for feeding said metal member from a feed-in position to a ready position and from said ready position to a mold-filling position, said first feeding means causing said metal member to eject the metal member fed in on the previous cycle, elastomeric material then having been bonded to the metal member of the previous cycle; second feeding means movable back and forth in a straight line for feeding an uncured elastomeric member from a feed-in position to a ready position and from there to a mold-filling position; means for retracting both said feeding means simultaneously from their mold-filling positions directly to their feed-in position; means for closing the mold when and only when both said feeding means have been fully retracted to their feed-in positions; means for actuating each said feeding means to advance from its feed-in position to its ready position at any time; means for actuating both said feed means to advance simultaneously from their ready position into their mold-filling positions when and only when said mold is fully open, said first feeding means includes a horizontal track along which said metal member is moved into a position between said mold members, said track having a pair of flanged horizontal parallel tracks having a cutaway portion, at said molding station and means at said cutaway portion for centering said metal member relative to said mold members.

2. The machine of claim 1 having means for varying the distance between said tracks according to the size of said metal member.

3. The machine of claim 1 wherein said centering means comprises: two pairs of anti-friction rollers centered relatively to said mold at said cutaway position, a plate supporting each said pair of rollers, one plate for each track, and two pairs of balls one yieldingly supported by said track and urging said plates toward each other for positively centering said case relatively to said mold members while yet releasing said case upon a pushing force applied through a subsequent case to eject a completed seal from said mold.

4. A molding machine for making a shaft seal from an annular metal case and an elastomeric ring, including in combination: a vertically mounted hydraulic mold having upper and lower movable mold members mounted for vertical movement toward and away from each other; case advancing means, including a first pneumatic cylinder having a piston with a first rod extending therefrom toward said mold and having a case advancer thereon, said cylinder having a port at each end; first valve means for sending air to said cylinder, said valve means having directional means for sending air alternately to each said port; means for reversing the direction of the air at the end of each stroke of said piston; means for closing said valve means at the end of the stroke where said piston is furthest from said mold in a retracted, feed-in position; means for energizing said first valve means to send air to said cylinder for moving said case from a feed-in position toward said mold; means actuated by movement of said case advancing means to a ready position to shut off said air to said cylinder; means for releasing said advancer from said case when it has advanced said case from said ready position into said mold; elastomeric ring advancing means comprising a second pneumatic cylinder like said first cylinder, a second rod like said first rod, second valve means like said first valve means and having corresponding means acting thereon, an advancer on the end of said second rod for said elastomeric ring, a pair of swinging support members pivotally mounted below said advancer, on which said ring rests, cam means for spreading said support members apart when they are centered over said mold to drop said ring into said mold; means for sending air to said first and second valves; means to send air to said first and second cylinders when both said advancing means are in their ready position and said mold is open, to advance said case and said ring into the mold, said reversing means then reversing the direction of the air to said cylinders to retract said advancing means to their retracted feed-in station; mold-closing means actuated upon return of said advancing means to their retracted positions; and timed means for opening said mold again after a timed interval.

5. The machine of claim 4 wherein said advancer comprises: a carriage mounted on said first rod, a third rod rotatably mounted on said carriage, said third rod having case-gripping means thereon and wherein said releasing means for said advancer comprises means for rotating said third rod to move said case gripping means out of contact with said case when said advancer has propelled said case into said mold.

6. The machine of claim 5 wherein said case-gripping means comprises a pair of spaced-apart projections both mounted on said third rod.

7. The machine of claim 5 having spring means normally urging said third rod into the rotational position where said case-gripping means are in case-contacting position and wherein said means for rotating comprises a stop adjacent said mold engaging said third rod and pushing it back relative to said carriage, and case means for rotating said rod when it is pushed back, locking means for locking said rod in the position where it is out of contact with said case, and lock release means actuated to release said locking means when said carriage reaches its retracted position, said spring means then urging said third rod back to the case-contacting position of said case-gripping means.

8. A molding machine for molding an elastomeric member to a supporting member, comprising: a vertically mounted mold having upper and lower movable mold members mounted for vertical movement toward and away from each other; first and second normally open electrical switches closed by said upper mold member when it is open; third and fourth normally open switches closed by said lower mold member when it is open; a first pneumatic cylinder having ports at each end and having a piston with a first rod extending therefrom toward said mold and having thereon advancing means for said supporting member; a first self-holding electrically actuated valve for sending air to said cylinder, said valve having directional means for sending air alternately to each said port; means for reversing the direction of said first valve at the end of each stroke of said piston; a second electrically actuated valve for sending air to and shutting off the air from said first valve; a fifth manually operated switch for energizing both said first and second valves to send air to said cylinder for moving said supporting member from a retracted feed-in position toward said mold; a sixth switch actuated by movement of said first rod to energize said second valve to cut off air to said first valve and thereby stop said supporting member at a ready position closely adjacent to said mold; a seventh switch closed when said supporting member is in its said ready position; elastomeric-member-advancing means comprising a second pneumatic cylinder like said first cylinder, a second rod like said first rod, a third valve like said first valve, a fourth valve like said second valve, advancing means on the end of said first rod, a pair of swinging support members pivotally mounted below said advancing means, on which said elastomeric member rests, means for spreading said support members apart when they are centered over said mold to drop said elastomeric member into said mold, an eighth switch corresponding to said fifth switch, a ninth switch corresponding to said sixth switch, and a tenth switch corresponding to said seventh switch, said first, third, seventh and tenth switches being in series with each other and operating when all are closed to energize said second and fourth valves to advance said supporting member and said elastomeric member from their ready positions into the mold, said reversing means then reversing said first and third valves to move both said advancing means back to their initial retracted, feed-in position; means for closing said first and third valves when their respective rods are fully retracted; eleventh and twelfth switches actuated respectively upon full retraction of said rods and in series with said second and fourth switches; mold closing means actuated by closure of all said second, fourth, eleventh, and twelfth switches for closing said mold; and timed means for opening said mold again after a predetermined cycle, thereby closing said first, second, third and fourth switches.

9. The machine of claim 8 wherein said mold closing means includes a high-volume relatively low-pressure pump, a high-pressure pump, a fifth control valve for the low-pressure fluid coming from said low-pressure pump, said fifth valve being actuated to two positions by high-pressure fluid to send, when in one position, low-pressure fluid to close said mold rapidly and, when in the other position, to send low-pressure fluid to open said mold rapidly, a sixth control valve for the high-pressure fluid coming from said high pressure pump for sending it, when said sixth valve is in a first position to said fifth valve to move that valve to the mold-closing position, and when said sixth valve is in a second position, to said fifth valve to move that valve to the mold-opening position, a camshaft control energized by closure of said second, fourth, eleventh and twelfth switches, having cams for connecting and breaking a series of electrical circuits as said camshaft rotates, including two circuits for actuating said sixth valve to its two actuated positions, and means for applying high pressure fluid to said mold when it is closed.

10. The machine of claim 8 wherein the reversing means for each said cylinder comprises an auxiliary rod connected to each piston rod for movement therewith and having contact means thereon; a separately mounted reciprocable rod having a pair of collars and supported adjacent to and parallel to said auxiliary rod for limited reciprocation upon engagement of said collars by said contact means, one said third rod being connected to said directional means of each of said first and third valves for reversal of the direction of the air at the end of each stroke of said piston.

11. The machine of claim 8 having preheating induction coil means at said case ready station for heating said case up to mold temperature.

12. A molding machine for making a shaft seal from an annular metal case and an elastomeric ring, including in combination: a vertically mounted mold having upper and lower movable mold members mounted on said frame for vertical movement toward and away from each other; first and second normally open electrical switches closed by said upper mold member when it is open; third and fourth normally open electrical switches closed by said lower mold member when it is open; track means supported for movement of a said case therealong from a feed-in station at one end of said tracks, through a ready station close to said mold and a molding station at said mold, to an ejection station on the opposite side of said mold from said ready and feed-in stations; case gripping means on said tracks at said molding station for positively centering said case relatively to said mold members while yet releasing said case upon a pushing force being applied through a subsequent case to move a completed seal to said ejection station; a first pneumatic cylinder mounted lengthwise between said tracks and having a piston with a first rod extending therefrom toward said mold and having thereon case pushing means, said cylinder having a first port at the end further from said mold and a second port at the end nearer said mold; a first self-holding electrically actuated valve for sending air to said cylinder, said valve being connected to both said ports and having directional means for sending air alternately to each said port; mechanical means for reversing the direction of said first valve at the end of each stroke of said piston; a second electrically actuated valve for sending air to and shutting off the air from said first valve; a fifth manually operated switch for energizing both said first and second valves to send air to said first port for moving said case from said feed-in position toward said mold; a sixth switch actuated by movement of said first rod to said ready position to energize said second valve to cut off air to said first valve as said case reaches said ready position; a seventh switch closed by said shoe when said case is in said ready position; elastomeric ring advancing means comprising a second pneumatic cylinder like said first cylinder, a third valve like said first valve, a second rod like said first rod, a fourth valve like said second valve, means on the end of said second rod for pushing and holding said elastomeric ring, a pair of swinging support members pivotally mounted below said pushing and holding means for movement therewith and on which said ring rests, means for spreading said support members apart when they are centered over said mold to drop said ring into said mold, an eighth switch corresponding to said fifth switch, a ninth switch corresponding to said sixth switch, and a tenth switch corresponding to said seventh switch, said first, third, seventh and tenth switches being in series with each other and operating when all are closed to energize said second and fourth valves to advance said case and ring into the mold, said first and third valves then being reversed to send said first and second rods to their retracted feed-in station; means for closing said first and third valves when their respective rods are fully retracted; eleventh and twelfth switches actuated respectively upon full retraction of said rods and in series with said second and fourth switches; mold closing means actuated by closure of all said second, fourth, eleventh and twelfth switches for closing said mold; and timed mold opening means for opening said mold after a timed interval, thereby closing said first, second, third and fourth switches.

13. The machine of claim 12 having a main frame and wherein said track means comprises a pair of flanged horizontal parallel tracks supported by said frame for movement of a said case therealong from said feed-in station at one end of said tracks, through said ready station close to said mold and said molding station at said mold to an ejection station on the opposite side of said mold from said ready and feed-in stations, said tracks having a cutaway portion at said molding station; a case gripping device on said tracks at said molding station and having two pairs of anti-friction rollers centered relatively to said mold, a plate supporting each said pair of rollers, one plate for each track, and two pairs of balls one yieldingly supported by each said track and urging said plates toward each other for positively centering said case relatively to said mold members while yet releasing said case upon a pushing force applied through a subsequent case to move a completed seal to said ejection station.

14. A molding machine for making a shaft seal from an annular metal case and an elastomeric ring, including in combination: a main frame; a vertically mounted hydraulic mold having upper and lower movable mold members mounted on said frame for vertical movement toward and away form each other; first and second normally open electrical switches supported by said frame and closed by said upper mold member when in its fully open position; third and fourth normally open electrical switches supported by said frame and closed by said lower mold member when in its fully open position; a pair of flanged horizontal parallel tracks supported by said frame for movement of a said case therealong from a feed-in station at one end of said tracks, through a ready station close to said mold and a molding station at said mold to an ejection station on the opposite side of said mold from said ready and feed-in stations, said tracks having a cutaway portion at said molding station; means supported by said frame for varying the distance between said tracks according to the size of said case; a case gripping device on said tracks at said molding station and having two pairs of anti-friction rollers centered relatively to said mold, a plate supporting each said pair of rollers, one plate for each track, and two pairs of balls one yieldingly supported by each said track and urging said plates toward each other for positively centering said case relatively to said mold members while yet releasing said case upon a pushing force applied through a subsequent case to move a completed seal to said ejection station; a first pneumatic cylinder mounted lengthwise between said tracks and having a piston with a first rod extending therefrom toward said mold, said cylinder having a first port at the end further from said mold and a second port at the end nearer said mold; a first self-holding electrically actuated valve for sending air to said cylinder, said valve having directional means for sending air to said first port when in one position and to said second port when in the other position; a second rod outside said cylinder connected to said first rod for movement therewith, said second rod having contact means thereon and a switch-actuating shoe; a third rod having a pair of collars and supported adjacent to and parallel to said second rod for limited reciprocation upon engagement of said collars by said contact means, said third rod being connected to said directional means of said first valve for reversal of the direction of the air at the end of each stroke of said piston; a second electrically actuated valve for sending air to and shutting off the air from said first valve; case pushing and holding means mounted on the end of said first rod; a fifth manually operated switch for energizing both said first and second valves to send air to said first port for moving said case from said feed-in position toward said mold; a sixth switch momentarily actuated by said shoe to energize said second valve to cut off air to said first valve as said case approaches said ready station; a seventh switch closed by said shoe when said case is at said ready position; preheating induction coil means at said ready station for heating said case; elastomeric ring advancing means comprising a second pneumatic cylinder like said first cylinder, a third valve like said first valve, a fourth rod like said first rod, a fifth rod like said second rod, and a sixth rod like said third rod, a fourth valve like said second valve, a loop on the end of said fourth rod for enclosing said elastomeric ring, a pair of swinging support members pivotally mounted below said loop, on which said ring rests, a cam track on said frame and cam followers on said support members engaging said track, said track having a portion for acting on said cam followers to spread said support members apart when they are centered over said mold to drop said ring into said mold, an eighth switch corresponding to said fifth switch and a ninth switch corresponding to said sixth switch, and a tenth switch corresponding to said seventh switch, said first, third, seventh, and tenth switches being in series with each other and operating when all are closed to energize said second and fourth valves to advance said case and ring into the mold; case release means for releasing said case from said pushing and holding means when said case is in said gripping device, said second, third, fifth and sixth rods acting simultaneously to reverse said first and third valves to send said first and fourth rods to their retracted feed-in station; means for closing said first and third valves when their respective first and fourth rods are fully retracted; eleventh and twelfth switches actuated respectively upon full retraction of said first and fourth rods and in series with said second and fourth switches; and mold closing means actuated by closure of all said second, fourth, eleventh, and twelfth switches for closing said mold, said mold closing means including a high-volume relatively low-pressure pump, a high-pressure pump, a fifth control valve for the low-pressure fluid coming from said low-pressure pump, said fifth valve being actuated to two positions by high-pressure fluid to send, when in one position, low-pressure fluid to close said mold rapidly and, when in the other position, to send low-pressure fluid to open said mold rapidly, a sixth control valve for the high-pressure fluid coming from said high-pressure pump for sending it, when said sixth valve is in a first position, to said fifth valve to move that valve to the mold-closing position, and when said sixth valve is in a second position, to said fifth valve to move that valve to the mold-opening position, a camshaft control energized by closure of said second, fourth, eleventh and twelfth switches, having cams for connecting and breaking a series of electrical circuits as said camshaft rotates, including two circuits for actuating said sixth valve to its two actuated positions, and means for applying high pressure fluid to said mold when it is closed.

References Cited in the file of this patent
UNITED STATES PATENTS

| | | |
|---|---|---|
| 1,722,763 | Peelle | July 30, 1929 |
| 1,880,858 | Davis | Oct. 4, 1932 |
| 2,582,891 | Strauss | Jan. 15, 1952 |
| 2,710,988 | Willcox | June 21, 1955 |
| 2,713,697 | Willcox | July 26, 1955 |
| 2,743,478 | Harlow et al. | May 1, 1956 |
| 2,745,135 | Gora | May 15, 1956 |
| 2,780,836 | Morin | Feb. 12, 1957 |
| 2,805,447 | Voges | Sept. 10, 1957 |
| 2,840,854 | Sherman | July 1, 1958 |
| 2,853,737 | Harlow | Sept. 30, 1958 |